United States Patent [19]

Auburn et al.

[11] Patent Number: 5,869,587
[45] Date of Patent: Feb. 9, 1999

[54] PROCESS FOR THE POLYMERIZATION OF ALPHA OLEFINS USING A NEW ALUMINOPHOSPHATE SUPPORT

[75] Inventors: Pamela R. Auburn, Kingwood, Tex.; Theresa A. Pecoraro, Danville, Calif.

[73] Assignee: Chevron Chemical Company, San Ramon, Calif.

[21] Appl. No.: 741,595

[22] Filed: Oct. 31, 1996

[51] Int. Cl.⁶ ............................. C08F 4/02; C08F 210/00
[52] U.S. Cl. ..................... 526/233; 502/208; 502/439; 526/88; 526/104; 526/106; 526/154; 526/226; 526/348; 526/348.2; 526/348.4; 526/348.5; 526/348.6; 526/348.7; 526/351; 526/352
[58] Field of Search ..................................... 502/208, 439; 526/226, 233, 348, 348.5, 348.6, 348.7, 351, 352

[56] References Cited

U.S. PATENT DOCUMENTS

| | | |
|---|---|---|
| 3,342,750 | 9/1967 | Kearby . |
| 3,904,550 | 9/1975 | Pine . |
| 4,080,311 | 3/1978 | Kehl . |
| 4,219,444 | 8/1980 | Hill et al. . |
| 4,364,842 | 12/1982 | McDaniel et al. . |
| 4,419,268 | 12/1983 | McDaniel et al. . |
| 4,424,139 | 1/1984 | McDaniel et al. . |
| 4,504,638 | 3/1985 | McDaniel et al. . |
| 5,030,431 | 7/1991 | Glemza . |

FOREIGN PATENT DOCUMENTS 921104527   6/1992   European Pat. Off. .

OTHER PUBLICATIONS

Journal of Catalysis vol. 102, pp. 10–20 (1986) "The Structure of Coprecipitated Aluminophosphate Supports" T.T.P. Cheung et al.

Primary Examiner—Fred Zitomer
Attorney, Agent, or Firm—Richard C. Gaffney

[57] ABSTRACT

Novel catalysts are provided for the polymerization of olefins such as ethylene. These catalysts comprise a novel amorphous aluminophosphate comprising, on a microlevel, sheets of aluminophosphate as well as spheres of aluminophosphate plus a chromium compound. These new catalysts are surprisingly active; result in more co-monomer incorporation than prior art catalysts and reduce the amount of low molecular weight material in the product.

10 Claims, 3 Drawing Sheets

2 MICRON

2 MICRON

2 MICRON

PROCESS FOR THE POLYMERIZATION OF ALPHA OLEFINS USING A NEW ALUMINOPHOSPHATE SUPPORT

FIELD OF THE INVENTION

This invention relates to a process for the polymerization of alpha olefins in the contact presence of a catalyst comprising a new aluminophosphate comprising, on a microlevel, sheets of aluminophosphate as well as spheres of aluminophosphate.

BACKGROUND OF THE INVENTION

Aluminophosphate gels and precipitates are old in the art. Examples of typical references include the following: U.S. Pat. No. 3,342,750 entitled "Compositions Containing Stable Aluminum Phosphate Gel and Methods of Making and Using Same" was issued Sep. 19, 1967 to K. K. Kearby and assigned to Esso Research and Engineering Company. This reference relates to high surface area aluminum phosphate gels and methods to make them and methods to use them. The aluminum phosphate gels have a surface area in the range of 200 to 600 square meters per gram. This appears to be the first reference where a true hydrogel of aluminum phosphate is prepared (see column 1, lines 53–55). Kearby's hydrogel is said to differ from the precipitates of the prior art which had relatively low surface area and poor heat stability. Kearby makes his hydrogels by the reaction of aluminum chloride and phosphoric acid with ethylene oxide.

U.S. Pat. No. 4,080,311, entitled "Thermally Stable Phosphate Containing Alumina Precipitates and Their Method of Preparation" was issued Mar. 21, 1978 to W. L. Kehl and was assigned to Gulf Research and Development Company. The Kehl reference refers to the teaching of Kearby and U.S. Pat. No. 3,904,550 to L. Pine (also Esso Research and Engineering Company). Pine, according to Kehl, relates that Kearby's hydrogels are "sensitive to water and difficult to form into a catalyst shape since they lose a substantial amount of their surface area during forming." Pine, again according to Kehl, teaches to use an aluminum alkoxide to make Kearby's hydrogels. Kehl teaches that such aluminum alkoxides are pyrophoric and thus difficult to handle. Kehl presents his own "simplified technique" to make an alumina-aluminum phosphate precipitate which comprises neutralizing a solution of aluminum cations and phosphorous anions at a controlled pH of 7 to 10. The resulting precipitates after drying and calcining have a surface area from 100 to 200 square meters per gram and an average pore radius from 75° to 150° Ångstrom and are thermally stable.

FIGS. 1–9 of Kehl are typical photomicrographs of various alumina-aluminum phosphates prepared by Kehl's technique and are incorporated herein by reference. Note the precipitates are "generally similar in appearance, but the particle size decreases as the alumina content increases" (Column 3, lines 51–56). The particles in the photomicrographs are spheroidal in appearance.

U.S. Pat. No. 4,219,444 entitled "Ethylene Polymerization Catalysts" issued Aug. 26, 1980 to R. W. Hill, William L. Kehl and T. J. Lynch and was assigned to Gulf Oil Corporation. The catalyst support is an amorphous precipitate of aluminum phosphate (column 2, lines 61, et seq.). Hill, et al appear to distinguish between two related types of supports. Both types are amorphous aluminum phosphates. They appear to differ only in the mole ratio of aluminum to phosphorous in the starting aqueous acidic medium containing the aluminum cations and phosphate anions. In the first type the aluminum to phosphorous mole ratio in the starting solution is "substantially equal" (column 3, lines 4–5). In the second type the aluminum to phosphorous mole ratio in the starting solution is from about 5:1 to substantially 1:1 (column 4, lines 5–11). In both types the preparation is substantially the same as described in the Kehl reference discussed above except the pH can be from 4 to 11 (rather than 7 to 11). The photomicrographs (FIGS. 1 and 2 of Hill, et al) are similar to those in the Kehl '311 patent i.e. solely spheres of aluminum phosphate are present in the microstructure. These photomicrograph of Hill et al and Kehl '311 are incorporated herein by reference.

As will be illustrated below, in chronological order, the emerging prior art after the Kehl '311 patent and the Hill et al '444 patent, added co-catalysts or other "improvements" but the thread woven through all of the prior art is the Kehl method of making the aluminophosphates. As noted above, the Kehl method is to neutralize an aqueous solution of aluminum cations and phosphate anions with a base as per Kehl in U.S. Pat. No. 4,080,311 or Hill and Kehl et al in U.S. Pat. No. 4,219,444.

Examples of typical prior art include:

(1) U.S. Pat. No. 4,364,842 entitled "Phosphate Supported Chromium Catalyst" issued Dec. 21, 1982 to Max P. McDaniel, et al of Phillips Petroleum Company. This reference relates to the use of a phosphate supported chromium catalyst for olefin polymerization. McDaniel, et al refer to the Hill, et al '444 patent for a method to prepare their phosphate support (see column 2, lines 38 et seq.). Thus, McDaniel, et al do not advance the art regarding how to make improved aluminum phosphates but rather rely on old methods such as those disclosed in the Hill, et al reference.

(2) U.S. Pat. No. 4,419,268 is entitled "Partially Hydrolyzed Silicate Treatment of Catalyst Support" and issued Dec. 6, 1983 to Max P. McDaniel of Phillips Petroleum Company. This reference also relates to an improved chromium catalyst for olefin polymerization. Again, McDaniel refers to the Hill, et al technique to prepare the aluminum phosphate support which is improved by the incorporation of silica (see column 2, lines 12 et seq.).

(3) U.S. Pat. No. 4,424,139 entitled "Catalyst Comprising a Phosphate and with a Bis-(Cyclopentadienyl) Chromium-(II) Compound" issued Jan. 3, 1984 to Max P. McDaniel, et al of Phillips Petroleum Company. This reference relates to phosphate-containing chromium catalyst systems for olefin polymerization. The aluminophosphate catalyst support can be prepared by a number of methods set forth in column 2, line 43, et seq. A conventional technique is referred to by reference to the Hill, et al '444 patent described above. Reference is also made to the U.S. Pat. No. 3,904,550 to Pine which uses an aluminum alkoxide as discussed above. McDaniel differs a little from Hill, et al in teaching a pH range of 5 to 10 and passing through the pH range of 4 to 5 quickly (see column 4, lines 36, et seq.).

(4) U.S. Pat. No. 4,504,638 entitled "Ethylene Polymers Made from Phosphate Supported Chromium Catalyst" issued Mar. 12, 1985 to Max P. McDaniel, et al of Phillips Petroleum Company. This reference again relates to phosphorus supported chromium catalysts for olefin polymerization. Again, McDaniel refers to the Hill, et al teachings in the '444 patent for how to prepare the aluminophosphates (column 2, lines 46, et seq.). The invention in this case is the use of a trialkylbborane co-catalyst.

(5) An article in the *Journal of Catalysis,* Volume 102, pages 10–20 (1986) entitled "The Structure of Coprecipitated Aluminophosphate Catalysts Supports" by T. T. P. Cheung, et al is of interest. Cheung, et al adopt the terminology "aluminophosphate" for the amorphous alumina-aluminum phosphate precipitates having a phosphorous to aluminum mole ratio of less than 1 and this terminology will be used in this specification. In preparation of the support, the technique of Hill, et al is again used except the pH was not held constant (see page 11, left-hand column near the bottom). Cheung, et al, on page 13, left-hand column, do make reference to the use of very concentrated solutions of salts and the rapid addition of ammonia but no particulars are given. The Cheung et al definition of aluminophosphate will be used in this specification.

(6) U.S. Pat. No. 5,030,431 entitled "High Pore Volume and Pore Diameter Aluminum Phosphate" issued Jul. 9, 1991 to R. Glemza of W.R. Grace Company. This reference relates to aluminum phosphate compositions characterized by high porosity and a phosphorous to aluminum ratio of approximately 1. The high porosity has a combination of high pore volume and low surface area, resulting in high average pore diameter. Glemza defines high pore volume as "at least 1 cc per gram with a low surface area of 200 to 400 square meters per gram" resulting in average pore diameters of at least 125° Ångstrom together with a phosphorous to aluminum mole ratio of 0.8:1 to 1:1 albeit the claims were limited to 0.9:1 to 1:1. The method of preparation was similar to Hill, et al and others but involved multiple neutralization steps.

(7) European Patent Application 921104527 (publication number 0 520 346 A2) dated Jun. 20, 1992 relates to an aluminophosphate supported chromium catalyst plus selected co-catalysts. The support has a phosphorous to aluminum mole ratio of close to or equal to 1 and a pore volume of greater than 1 cc per gram. The phosphate supports are known and made by known techniques.

While aluminophosphates have long been known, along with their methods of preparation, such aluminophosphates have not as yet achieved commercial success. The prior art relating to aluminophosphates suggests the use of such materials as supports for catalysts used in the polymerization of mono-1-olefins (alpha-olefins). These prior art alumino-phosphates have a number of shortcomings.

For example, early aluminophosphates supported catalysts were not successful commercially because of their low activity. The activity was increased by the addition of a co-catalyst (such as in U.S. Pat. No. 4,504,638 to McDaniel discussed above) but the presence of a co-catalyst tends to increase an undesirably low molecular weight portion in the polymer product. This low molecular weight material causes problems during subsequent processing such as smoking.

Thus, there is still a need for an aluminophosphate supported olefin polymerization catalyst which has sufficient activity without the need for a co-catalyst so that the resulting polymer product has an acceptably small portion of low molecular weight material.

It is also found that, while highly desirable, very little comonomer e.g. 1-butene is incorporated into the copolymer during ethylene butene copolymerization using aluminophosphate supported catalysts prepared by the techniques of Kehl or Hill et al.

Quite surprisingly, the new polymerization catalysts of this invention overcome these shortcomings of the prior art. The new catalysts of this invention are surprisingly more active for ethylene polymerization than aluminophosphate supported catalysts made by the Kehl or Hill et al techniques of the prior art. Furthermore, the new polymerization catalysts of this invention surprisingly provide a polymer with a greatly reduced low molecular weight component. In addition, the use of the new catalysts of this invention results in unexpected and desirable increases in the uptake of comonomers present during the polymerization of ethylene again compared to aluminophosphate supported catalysts prepared by the Kehl '311 technique.

It has also been observed that the use of aluminophosphate supported catalysts made by the Kehl '311 technique results in polymers which have a broader MWD (molecular weight distribution) than the polymer made using the new aluminophosphate supported catalysts of this invention.

In addition, the prior art aluminophosphates lacked a combination of physical properties which have now been found to characterize superior polymerization catalysts. It is the combination of a high macropore volume of at least 0.1 cc's per gram plus a fragmentation potential (to be defined below) of preferably 30 to 60 plus a preferred macropore volume of 0.3 to 0.8 cc's per gram which particularly characterize the superior polymerization catalysts. Quite surprisingly the new aluminophosphate made by the new technique of this invention provide this combination of properties in one preferred form of the invention. The combination of high macropore volume and a fragmentation potential above 30 would be expected to result in an aluminophosphate which is physically unstable. Quite surprisingly, the aluminophosphates of this invention are both physically and thermally stable. While not certain, it is believed to be the presence of sheets of aluminophosphate in the microstructure which results in the packing of the microstructures in such a way that a high macropore volume and a high fragmentation potential are achieved along with physical and thermal stability.

It is an object of this invention to provide an improved 1-olefin polymerization process of increased catalytic activity.

It is further object of this invention to provide an improved ethylene-higher 1-olefin copolymerization process wherein more of the higher 1-olefin is incorporated into the resulting copolymer.

It is a further object of this invention to provide an improved 1-olefin polymerization process using a catalyst based on an aluminophosphate support with high macroporosity together with an improved fragmentation potential.

It is a further object of this invention to provide an improved 1-olefin polymerization process wherein the resulting polymer has a reduced amount of low molecular weight material.

While not certain, and not wishing to be bound by any theory, it is believed the catalyst supports—to achieve the desired polymer properties—need a greater amount of large pores together with sufficient physical strength so that the catalyst does not fragment too easily. It is believed to be the presence of sheets of aluminophosphate on a microlevel which provides the strength for the new aluminophosphates which preferably have a macropore volume of at least 0.1 cc per gram.

It is also known from the prior art that an alpha olefin polymerization process can be conducted in slurry, solution or gas fluid bed processes. The fluid bed process requires not only that the catalyst possess certain properties to be successfully applied, but also that the resulting polymers have an appropriate particle size to bulk density ratio so that the fluid bed does not collapse during operation.

It is one of the objects of this invention to provide an improved 1-olefin gas phase fluid bed polymerization process with improved catalyst activity.

It is another object of this invention to develop a smooth operating gas phase polyethylene process to produce a polymer product having an acceptable low ash content without the need for a co-catalyst.

It is yet another object of this invention to produce a polyethylene product in a gas phase operation without a co-catalyst which product has a high molecular weight and narrow MWD.

The above new class of aluminophosphates have a surface area by the BET method after calcining at 300° C. for 8 hours from 90 to about 300 m²/gram, usually from 90 to 110m²/gram. The mesopore volume by the BET method after calcining as above is usually from 0.2 to 1 cc's per gram, preferably from 0.3 to 0.8 cc's per gram and most preferably from 0.5 to 0.7 cc's per gram. By "mesopores" are meant pores having a diameter from 50° to 1000° Å.

Macropores are defined for this specification as those having a diameter greater than 1000° A. The macropore volume is determined after calcining the aluminophosphate at 300° C. for 8 hours. Usually the aluminophosphates are spray dried before calcining. In one instance, the undried aluminophosphate filter cake was directly calcined in a muffle furnace at 300° C. for 8 hours and the resulting material had a very high macropore volume of 0.76 cc's per gram. The macropore volumes for the aluminophosphate to be used as supports for olefin polymerization catalysts is preferably above 0.1 cc's per gram, more preferably from 0.1 to about 0.85 cc's per gram, still more preferably 0.1 to 0.75 cc's per gram and most preferably from 0.15 to about 0.4 cc's per gram.

SUMMARY OF THE INVENTION

In accordance with the invention, an improved 1-olefin polymerization process using a catalyst supported on new aluminophosphates has now been discovered. These new aluminophosphate supports are amorphous; have a P to Al mole ratio of about 1:1 or less; preferably have a macropore volume of greater than 0.1 cc/gram; and possess; in their microstructure, sheets of aluminophosphate as well as spheres. In one preferred embodiment, the supports have a fragmentation potential (to be defined below) of greater than 30, preferably from 30 to 60.

The catalyst of this invention comprises a catalytically active amount of a catalytic component on the aluminophosphate support described above. The active catalytic component can be any component which has activity for the polymerization of alpha-olefins and which does not interact adversely with the aluminophosphate support. The scope of this invention is not meant to be limited to a particular active catalytic component. The gist of this invention resides in the use of the new aluminophosphate supports, as described herein, for the preparation of olefin polymerization catalysts.

For example, Ziegler type catalysts can suitably be used as the active catalytic component as can titanium or other metals such as chromium. Preferably the active catalytic component is chromium.

The active catalytic component can be incorporated into or preferably dispersed on the aluminophosphate support by any of the methods known in the prior art. The amount of the active catalytic component is usually from 0.1 to 10 weight percent of the final catalyst.

Typically the aluminophosphate is impregnated with an acqueous solution of $CrO_3$. After drying, the catalyst is activated at temperatures usually in the 600° C. to 800° C. range for from 2 to 16 hours to disperse the $CrO_3$ on the support. The chrome is reduced in the presence of hydrogen or ethylene to the $Cr^{+2}$ or $Cr^{+3}$ species or a mixture thereof.

Regardless of how the chromium is deposited on the support, the final catalyst usually contains from 0.1 to 10 weight percent chromium, preferably 0.2 to 5 weight percent chromium and most preferably about 0.3 to 1.5 weight percent chromium.

Figure 1:
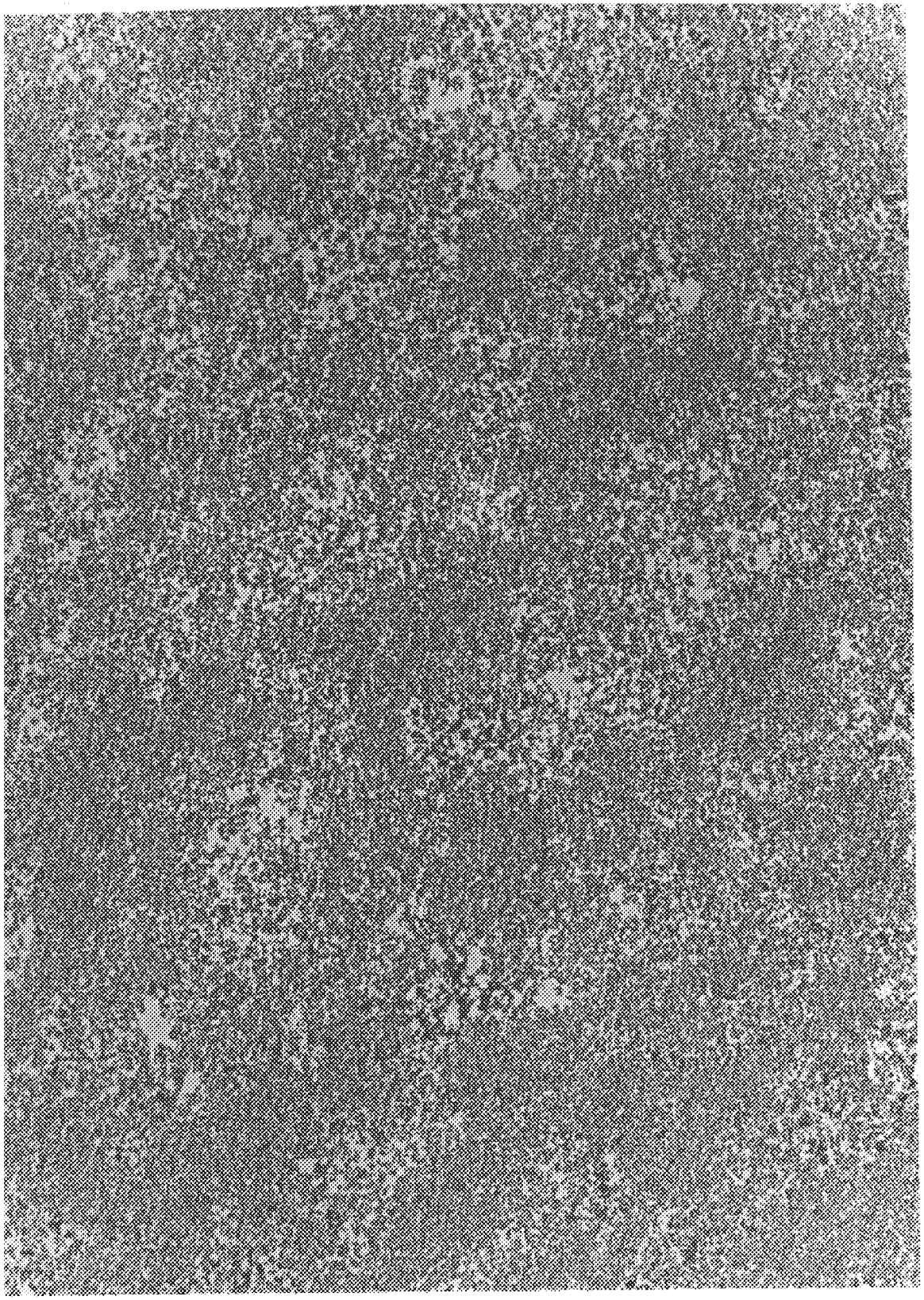
FIG. 1 is a TEM photomicrograph for the aluminophosphate made by the prior art technique of Example 1.

The Tables in this specification are as follows:

Table 1—Characteristics of calcined aluminophosphates

Table 2—Variables in preparation of aluminophosphates

Table 3—Batch polymerization using the catalyst of Example 1

Table 4—Batch polymerization using the catalyst of Example 2

Table 5—Gas phase polymerizations runs using catalysts of Examples 1 and 16.

DETAILED DESCRIPTION OF THE INVENTION

The catalysts for use in the polymerization process of this invention comprise an active catalytic component on certain new aluminophosphate supports. A co-catalyst can also be employed if desired.

Chemically pure aluminophosphate hydrogels and precipitates are very closely related, having the empirical formula $Al_2O_3\text{-}xAlPO_4$. It is also known that physical properties such as surface area and pore size and pore size distribution can differ significantly not only between aluminophosphate hydrogels and precipitates but even between various types of precipitates, depending on the treatment of the precipitates both during and after preparation i.e. hot washing; hot aging; etc.

Certain aluminophosphate precipitates have now been discovered which have excellent thermal and physical stability, together with a relatively high amount of macroporosity. These materials are particularly suited for use as catalyst support materials. The aluminophosphate composite precipitates of this invention wherein the phosphorus to aluminum mole ratio is about 1:1 or less are characterized by being amorphous; having a macroporosity of greater than about 0.1 ccs per gram and having, on a microlevel, sheets of aluminophosphate as well as spheres of aluminophosphate. The above characteristics of the aluminophosphate are after drying and calcining at a temperature of 300° C. for 8 hours.

The new aluminophosphates have, in addition, certain characteristics in their preferred form as follows:

(1) Surface area by the BET Method

Typically the surface area of the new aluminophosphates is from about 90 to about 300 m²/gm, more typically from 90 to 110 m²/gm. The surface areas are after calcining at 300° C. for 8 hours.

(2) Mesopore Volume by the BET Method

By "mesopore volume" in this specification is meant the volume occupied by pore sizes from 20° to 1000° Å. The mesopore volume is usually from 0.2 to 1 cc's per gram preferably from 0.3 to 0.8 cc's per gram; more preferably from 0.5 to 0.7 cc's per gram. There are substantially no micropores (less than 20° Å) in these aluminophosphates.

(3) Macropore Volume by the Mercury Technique

By "macropore volume" in this specification is meant the volume occupied by pore sizes in excess of 1000° A. It is particularly desirable for some end uses such as the polymerization of olefins to have a macropore volume in excess of 0.1 cc's per gram. The problem in the past was obtaining supports with a high macropore volume in excess of 0.1 cc's per gram along with physical stability. The aluminophosphates of this invention in one of their preferred forms have a high macropore volume and are physically stable as shown by the fact they were successfully used in a fluid bed gas phase polymerization of ethylene.

The macropore volumes are usually measured after spray drying and calcination at 300° C. for 8 hours. The macropore volume is taken by mercury porosimetry test (by ASTM Designation: D4284-8 where gamma is taken to be 473 dynes per cm and the contact angle is taken to be 140 degrees).

The macropore volumes of the new aluminophosphates can vary from 0.02 to 0.85 cc's per gram but preferred macropore volumes are as set forth above.

Higher macropore volume materials within the range set forth above were prepared by directly calcining the undried aluminophosphate filter cake at 300° C. for 8 hours in a muffle furnace. The usual spray drying followed by calcining at 300° C. for 8 hours yielded aluminophosphates with macropore volumes from about 0.03 to about 0.55 cc's per gram.

(4) Mean Mesopore Diameter by BET Method

The mean mesopore diameter of the new aluminophosphates can be from 50° to 450Å°; typically is from 150° to 400° Å and most typically is from 260° to 300° Å.

(5) Fragmentation Potential and Sonication Number

The testing of catalysts so as to determine attrition characteristics is recognized in the art. These tests typically involve introduction of catalyst particles into a vessel and subsequent agitation of the particles. In such an arrangement, attrition results primarily from abrasion caused by particles impacting with each other as well as with the wall of the vessel.

For example, in processes where particles are subjected to fluidized bed conditions, fluidized tests such as air-jet testing are common in as far as they can be considered directly relevant to the performance of particles under such conditions.

While such tests can be effective in testing attrition under certain conditions, they have largely proven ineffective with respect to predicting the effectiveness of catalysts in processes where the attrition is related to the fractionation of the catalyst.

Moreover, such techniques fail to accurately report that polymerization catalysts, unlike catalysts employed in other processes, e.g., catalytic cracking, are subject to attrition at two different stages, i.e., activation and polymerization. Thus, while traditional techniques, e.g., air-jet testing, may provide an effective model for attrition occurring during activation, such techniques are not an effective model for attrition occurring during polymerization and thus are not sufficient to deal with such catalysts.

One particular process in which fractionation of the catalyst occurs is the polymerization of olefins. Olefin polymerization processes are well recognized in the art. Typical examples of such processes include slurry batch, e.g., slurry loop and gas phase olefin polymerization processes.

Although each of these processes utilize catalysts in the production of polyolefines such as polyethylene, they differ significantly with respect to the dynamics of particle growth therein. For example, gas phase processes include as much as 85% ethylene while slurry loop type processes have a much lower ethylene solubility, e.g., typically 8% maximum. Accordingly, catalysts which may be effective in one olefin polymerization process may not be found effective in another process. Surprisingly, the new aluminophosphate supported polymer catalysts of this invention are effective in both batch and gas phase polymerization processes. One aspect of the present invention is based upon the surprising discovery that the "Fragmentation Potential" of catalysts, such as olefin polymerization catalysts, as determined by sonication, can be used in determining the expected efficiency of a catalyst in a process where catalyst fragmentation will occur.

The sonication process for use in the present invention can effectively be employed within any sonication environment with sonication baths and in particular, sonication baths employing water, being preferred.

This sonication test can then typically take on one of two forms. Either the material can be sonicated for a predetermined period of time, e.g., 30 minutes, and the increase in fines, e.g., percent increase, subsequent to sonication can be determined. This test directly provides what is called the "fragmentation potential".

Alternatively, the material can be sonicated for a period of time sufficient to reach a preselected mean particle size. The result of this particular test is called the "Sonication Number". Although this specification will typically make reference to the fragmentation potential, the concepts and advantages are the same for both of these basic tests.

In fact, as is readily apparent, these tests are basically analogous with the numerical results being inversely related. That is, a catalyst which has a small increase in fine production over a predetermined period of time will typically require a longer time to reach the preselected mean particle size. The inverse is also true, a catalyst having large percent increase in fine production will have a smaller relative period of time to reach the predetermined mean particle size.

The particular sonication test employed is not critical to the present invention and the selection of test and equipment is largely determined by practical considerations such as time allotted to perform the test.

For purposes of this specification, the "fragmentation potential" is defined as the percent increase in the percentage of particles which are smaller than 40 microns after sonication for 30 minutes in an aqueous medium plus a dispersant using an Horiba LA 900 instrument. Calculation of the fragmentation potential, of course, involves taking the percent of particles which are smaller than 40 microns after 30 minutes and subtracting the percent of particles smaller than 40 microns in the sample before sonication. It was recognized that the initial sample could have some spheres of less than 40 microns agglomerated with somewhat larger spheres. A preferred variation is to initially deaglomerate the sample by sonicating the sample for one minute to obtain a base value for the percentage of particles smaller than 40 microns before sonicating for 30 minutes as described herein. In this instance, the fragmentation potential is calculated by taking the percentage of particles smaller than 40 microns after 30 minutes and subtracting the percentage of particles smaller than 40 microns in the sample after an initial one minute sonication. The fragmentation potential using the preferred technique is lower, as expected. In the data to be given below, the fragmentation potential is given as (30-0) or (30-1), the "0" indicating no pre-sonication, and the "1" indicating a pre-sonication of one minute. In an analogous test, the sonication number is determined as the time for the mean particle size of a test sample to fall to 40 microns.

Preferably the fragmentation potential is from 10 to 87 percent, more preferably above 30 percent and most preferably from 30 to 60 percent.

Similarly, the Sonication Number is preferably from 5 to 200 minutes; more preferably from 10 to 150 minutes; and most preferably from 20 to 100 minutes. These numbers when using a Malvern Particle Size Analyzer with 300 mm focal length and an active beam length of 2 mm.

The fragmentation potential and sonication numbers set forth above are for the new aluminophosphates of this invention after calcining at 300° C. for 8 hours. The fragmentation potential and sonication number will, of course, vary depending on whether the catalyst base is tested before or after calcining; before or after the addition of chromia, etc. Likewise, the optimal fragmentation potential will differ from other bases such as silica.

While not wishing to be bound by any theory, it is believed the sonication technique is a unique tool for providing a fingerprint of an improved ethylene polymerization catalyst because of the shattering of the particles as shockwaves move through the internal pore structure. Accordingly, it is believed that such a process closely resembles the fracturing process which can occur during polymerization, i.e., the catalyst particle breakup due to the accumulation of polymer and pressure within the pore structure.

(6) Thermal Stability

Thermal stability is defined as less than a thirty percent loss of surface area after heating at 600° C. for 2 hours versus heating for 8 hours at 300° C. The loss of surface area of the preferred aluminophosphate made by the method of this invention (see Example 16 below) was 18% i.e. 93 m$^2$/gm after calcining at 300° C. for 8 hours and 76 m$^2$/gm after calcining at 600° C. for 2 hours.

(7) Microscopy

The new aluminophosphate compositions of this invention possess a very unique and important characteristic over the aluminophosphates of the prior art i.e. the new aluminophosphates have a microstructure of sheets of aluminophosphate as well as spheres of aluminophosphate.

Physically, the new aluminophosphates are spray dried to form spherical particles roughly 0.01 cm (100 microns) in diameter. The microscopic examinations of these particles is done using standard transmission electron microscope (TEM) techniques. For example, observe the TEM specimen in the bright field imaging mode. For the purpose of this specification, it is necessary to prepare the TEM specimen by the microtomy technique.

The microtome technique is a well established specimen preparation technique in the field of transmission electron microscopy. Its description can be found in standard reference published literature, for example, T. F. Malis and D. Steele, "Ultramicrotomy for Materials Science," in "Workshop on specimen preparation for TEM of materials II," ed. R. Anderson, vol. 199, Materials Research Symposium Proceedings (MRS, Pittsburgh, 1990) and N. Reid, "Ultramicrotomy," in the "Practical methods in electron microscopy" series, ed. A. M. Glauert, publ. Elsevier/North Holland, 1975. Briefly, it involves embedding the sample in a resin, form a pellet by polymerizing the resin in a mold, then cut thin sections using a microtome equipped with a diamond knife. In the work for this specification, the resin used was L. R. White resin. The typical thin section would have a thickness of about 0.06 microns. Care needs to be taken to embed whole aluminophosphate particles in order that views of the entire random cross sections of the aluminophosphate particles are presented. Furthermore, it is important that prudent sampling techniques be used to collect the sample to be used for the TEM specimen preparation step. The portion of aluminophosphate particles that were embedded should be selected from a sample by sequentially dividing the originally collected sample into quarter portions until the desired amount of material suitable for the embedding process is reached.

In the TEM examination of specimens, it is always a balance between the amount of details to be observed and the amount of material to be examined to ensure representativeness. To observe the increasing details of relevant microscopic features requires higher magnifications while this decreases the field of view and the amount of material examined. However, a modern microscope allows the operator to easily change magnifications from 100× to 1,000,000×. It is standard practice to survey the sample at low magnifications, identify and confirm the views that are typical and representative of the sample, then increase the magnification as necessary to examine the details. Images will then be recorded to illustrate the characteristics of the sample. The recorded images (which usually are on a 3.25 "×4" negative) are then printed and usually further magnified. Such further magnification occurs by printing, for example, to an 8.5"×11" print.

For the purposes of this specification, the printed images of photomicrographs having a destination magnification of 12000×±1200 × is suitable. The term "destination magnification" is used to embrace the sum of the magnification on the negative image and the magnification that occurs when the negative is further magnified when printed to a larger size. This destination magnification takes into account some newer machines which use cameras to produce a digital image onto a computer for possible printing at a later time.

Figure 2:
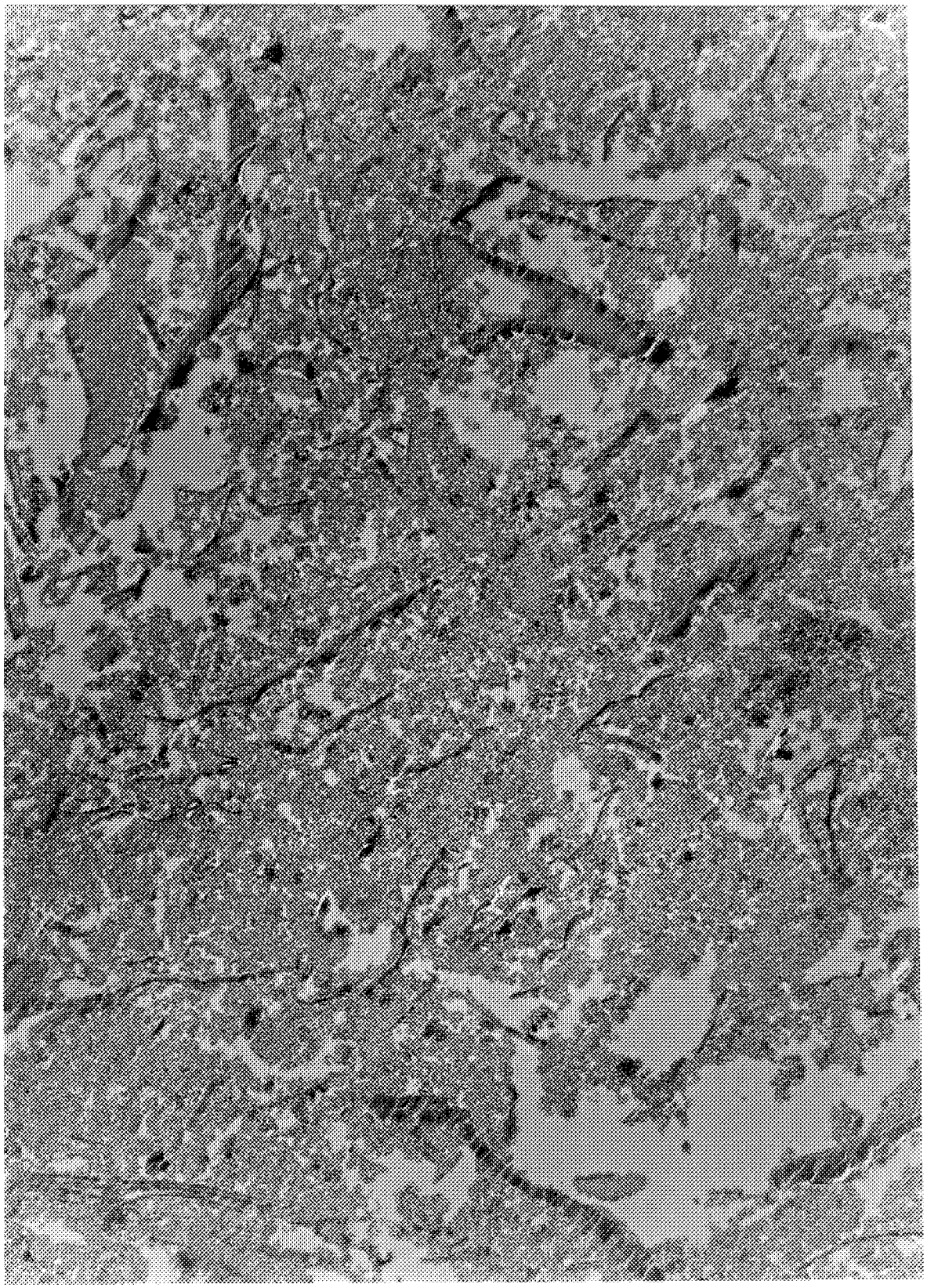
FIG. 2 is a TEM photomicrograph for the aluminophosphate mode by the technique of this invention in Example 2.

FIG. 1 is a photomicrograph of an aluminophosphate made by the technique of the prior art (Example 1 below). FIG. 1 shows only spheres of aluminophosphate. This confirms the presence of spheres as shown by FIGS. 1 and 2 of U.S. Pat. No. 4,219,444 of Hill et al or FIGS. 1–9 of U.S. Pat. No. 4,080,311 to Kehl.

Figure 3:
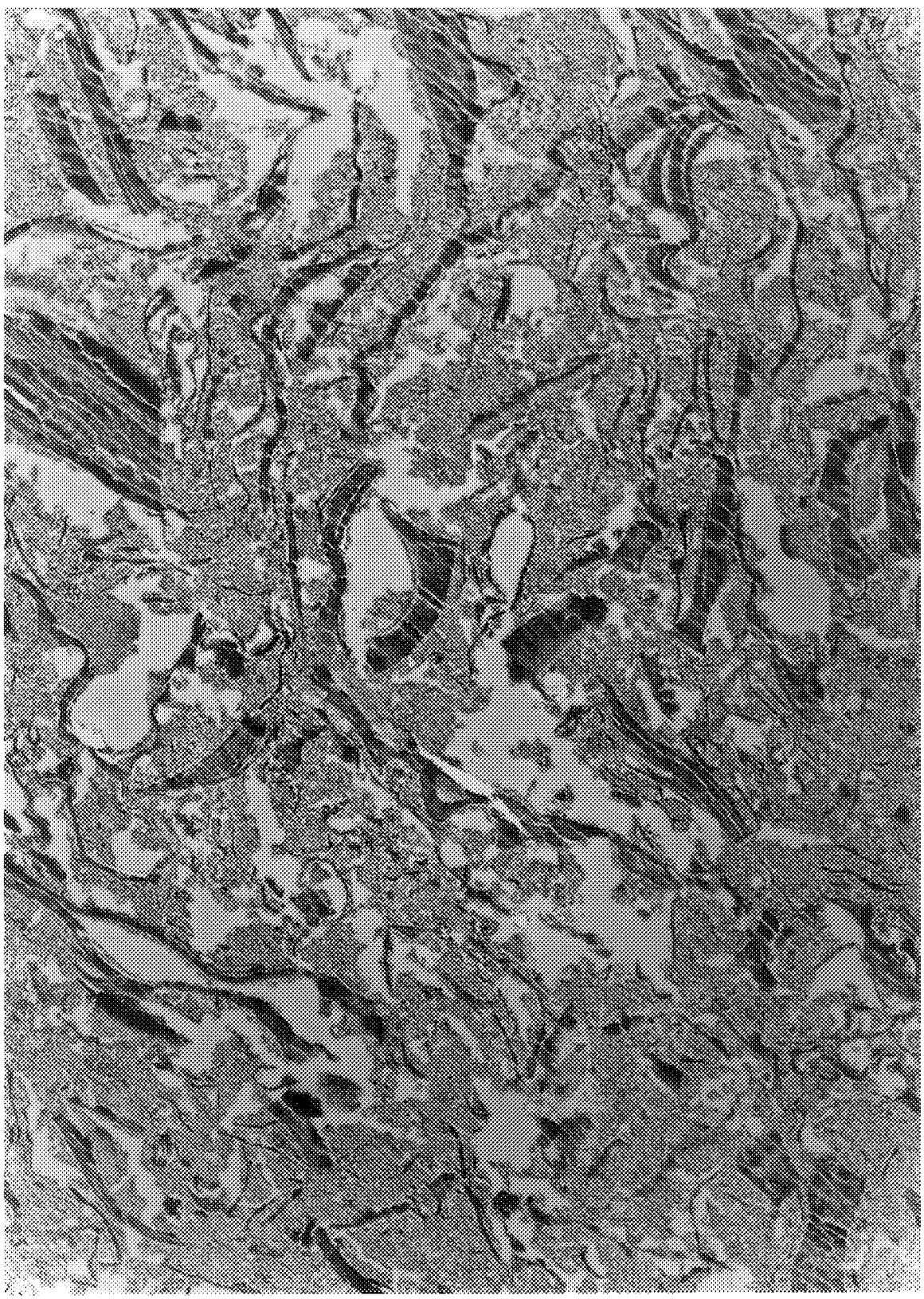
FIG. 3 is a TEM photomicrograph for the aluminophosphate of Example 16.

FIG. 3 is a photomicrograph of one of the aluminophosphates of this invention as prepared by Example 16 below. Referring to FIG. 3, it can be seen that in addition to round particles, there are line features of various thickness. It is obvious that the cross section of spheres by a plane as well as the projection of spheres onto a plane will both result in round features. In this case, the round particles tend to be smaller than the thickness of the microtome sections. Hence, the round particles are viewed in projection in the images. It is also well known in elemental analytical geometry that the intersection between any extended surface and a plane is a line. The line is a straight line if both surfaces are planer. The line features seen in FIG. 3 are thus sheets that are present in the samples.

An image analysis technique has been developed to quantify the amount of sheets per unit volume in a given sample. This is based on the important general mathematical expressions that relate the features of the microstructure (interfaces, lines, and points) and intersections with an arbitrary test line. The equations are set forth in C. S. Smith and L. Guttman, "Measurement of internal boundaries in three dimensional structures by random sectioning," Trans. AIME, vol. 197, p 81, (1953). The relevant expression for this specification is:

$$S_v = 2N_L \quad (1)$$

or more generally $S_v$ is proportional to $N_L$ which can be written as $$S_v = \text{constant} \times N_L \quad (2)$$

where $S_v$=interface area per unit volume, in units of $mm^2/mm^3$ or $micron^2/micron^3$. and $N_L$=average number of intersections per unit length between a random test line and the traced of the extended surface in the image, in units of $mm^{-1}$ or $micron^{-1}$.

The field of study for this type of analysis is called stereology. It is the study of three dimensional structures as revealed in two dimensional images. Explanations and example applications of stereological analysis to the characterization of microstructures can be found in the text books by R. T. DeHoff and F. N. Rhines, "Quantitative Microscopy," publ. TechBooks/McGraw Hill, 1968. and J. C. Russ, "Computer-Assisted Microscopy," Plenum Press, 1990. DeHoff and Rhines derived formula (1) above which defines the "constant" as "2" for one interface. In the case of sheets being disposed among spheres, there are two interfaces, one on each side of the sheet and thus the "constant" for formula (2) above 2×2 or 4.

Hence, the samples in this invention can be specified by the parameter $S_v$. In practice, as evident in equations (1) and (2), one only needs to determine $N_L$. An example procedure is:

1. Select at least five representative printed images of 8.5 in. ×11 in. size at 12,000× destination magnification.

2. Overlay a set of test lines drawn on a transparent sheet of paper on the image. The orientation of these lines must be random with respect to the line features resulting from the sheets. The total length of these lines on the transparency should be at least 150 cm.

3. Measure and record the number of intersections between the test lines and the lines on the image then divide it by the total length of the test lines.

4. The numerical results for $N_L$ should be presented in $micron^{-1}$. Hence, care must be taken to convert the distances measured on the photomicrographs into correct units of length. That is, properly include the effect of the image magnification.

The new aluminophosphate compositions of this invention are unique in having a phosphorus to aluminum mole ratio of less than 1; being amorphous, and having, on a microlevel shown by TEM at about 12000× magnification to have sheets as well as spheres of aluminophosphate. It has been verified by energy dispersive analysis at high spatial resolution in the transmission electron microscope that the chemical composition of the sheets is indistinguishable from the chemical composition of the spheres. While it is believed that the presence of any quantity of sheets is the unique feature of the new aluminophosphates of this invention, it is preferred that the aluminophosphates have an $N_L$ from 0.01 to 3 $microns^{-1}$; more preferably from 0.15 to 1.5 $micron^{-1}$; and most preferably from 0.3 to 1 $micron^{-1}$.

In addition to the properties set forth above, the particle density in grams per cc for the aluminophosphates of this invention is generally from 0.6 to 0.75. The skeletal density in grams per cc is generally from about 2.3 to 2.5. The total pore volume by the mercury porosimetry technique is usually from 0.5 to 2 cc's per gram; more usually from 0.6 to 1.3 cc's per gram; and most usually from 0.8 to 1.1 cc's per gram.

METHOD OF PREPARATION

As noted above, Hill, et al and other references teach that the conventional method of making aluminophosphate precipitates is to neutralize in a batch stirred reactor an acidic medium containing aluminum cations and phosphate anions. The aluminophosphate is typically retained in the batch stirred reactor as fresh reactants are added until all of the reactants are exhausted for that batch. When these conventional techniques are employed, the resulting aluminophosphate contains, on a microlevel, only spheres of aluminophosphate as shown in FIGS. 1 and 2 of Hill, et al U.S. Pat. No. 4,289,863 and FIGS. 1 through 9 of Kehl, et al, U.S. Pat. No. 4,080,311 which are incorporated herein by reference.

Working Example 1 below describes the preparation of an aluminophosphate by the technique of Hill et al in U.S. Pat. No. 4,289,863. FIG. 1 in this specification is an image of this aluminophosphate after calcining at 300° C. for 8 hours at a magnification of about 11,000×.

Referring to FIG. 1 in this specification it can be seen that only spheres are observed which compares with the earlier findings of Kehl in his '311 patent or Hill et al in their '863 patent as discussed above.

In accordance with the invention, a method of preparing an amorphous aluminophosphate having a phosphorus to aluminum mole ratio of about 1:1 or less comprises:

(a) forming a first aqueous solution of aluminum and phosphorus ions wherein the mole ratio of the phosphorus ions to the aluminum ions is about 1:1 or less;

(b) forming a second aqueous solution to neutralize said first aqueous solution;

(c) contacting said first and second aqueous solutions under mixing conditions with sufficient shear to produce an aluminophosphate precipitate having in its microstructure both sheets and spheres of aluminophosphate.

This technique is quite simple and involves, in one embodiment, the simultaneous addition of a solution of an aluminum cations and phosphate anions and a base such as an aqueous solution of an ammonia based material selected from the group consisting of ammonium hydroxide, ammonium carbonate, ammonium bicarbonate, or urea to a high mix, high shear reactor sometimes known as an emulsifier. Kehl, in U.S. Pat. No. 4,080,311, teaches vigorous mixing as do others but the key to producing an aluminophosphate composition which contains, on a microlevel, both sheets and spheres of aluminophosphate is the use of vigorous mixing with shear. The neutralization reaction is exothermic and the increase in temperature is reflected by the rate of addition of the aqueous solution of the aluminum cations and phosphorous anions and the rate of the addition of the base to the mixer-reactor. It is preferred that the concentration of the salts and the base be high so that on mixing of the two streams a precipitate is immediately formed. The precipitate is removed from the high shear reactor substantially as quickly as it is formed.

In addition, as noted above, the preparation of aluminophosphates having a fragmentation potential of over 30 was desirable for use of the aluminophosphate as a polymerization catalyst support. The aluminophosphates prepared by the technique of Example 1 below i.e. the prior art, resulted in aluminophosphates having a fragmentation potential of less than 30. Using the above described continuous technique with vigorous mixing with shear, aluminophosphates having fragmentation potentials of over 30 (and indeed over 50) were achieved so long as the shear was sufficient and the concentration of reactants high.

It is of interest that the initial aluminophosphates produced by the continuous mixing with shear technique were so hard that the fragmentation potential was about 15. While these hard aluminophosphates may find use in other areas, one primary goal was to discover an aluminophosphate having a fragmentation potential of over 30 for use as a support for a polymerization catalyst. Surprisingly, as the shear during mixing increased along with the concentration of reactants, the resulting aluminophosphates had fragmentation potentials of 30 and above which were well beyond fragmentation potentials of aluminophosphates produced using the prior art technique of Hill et al or Kehl. Initially it was believed these new aluminophosphates having fragmentation potentials of 30 and above would be too soft to be useful as a catalyst base. Surprisingly the new aluminophosphates were physically stable. While not desiring to be held to any theory, it is believed the presence of sheets of aluminophosphate in the microstructure results in a different packing of the particles which gives rise to the unusual properties of these new aluminophosphates.

In preparing the new compositions of this invention, a first aqueous solution of aluminum cations is formed, in one preferred embodiment, by dissolving any suitable inorganic aluminum salt in water. Suitable aluminum salts include: aluminum chloride, aluminum nitrate and aluminum sulfate. In essence, any aluminum salt which is soluble in water can be employed and the particular type of aluminum salt is not critical. The concentration of aluminum salt to employ is not critical but is preferred to be somewhat concentrated for ease of handling in the emulsifier mixer.

The concentration of aluminum salt can suitably be from 12 to 80 weight percent or more of the first aqueous solution; more suitably from 30 to 70 weight percent; and preferably from 60 to 70 weight percent. As noted above, the use of the lower concentration of salts resulted in the formation of harder aluminophosphate precipitates or hydrogels (these terms are used interchangeably in this specification). It is preferred to use a high enough concentration of aluminum salt so that on neutralization a precipitate is immediately formed.

The aqueous solution of aluminum cations is acidified with phosphoric acid which also provides the source of phosphate anions. The amount of phosphoric acid to employ is such that the phosphorous to aluminum mole ratio in the acidified solution is close to the aluminum to phosphorous mole ratio desired in the final product. The pH of the acidified solution containing the aluminum cations and phosphorous anions is usually about 1. The concentration of phosphate anions is such that the phosphorous to aluminum mole ratio is approximately 1:1 or less. A mole ratio of phosphorous to aluminum in this first aqueous solution can be about 1:1 or a little higher and still have the resulting aluminophosphate have a mole ratio of about 1:1 or less and be amorphous.

The phosphorus to aluminum mole ratio for the aluminophosphate product is less than, or equal to one. The phosphorus to aluminum mole ratio, preferably, is from 0.2:1 to about 1:1; more preferably, the ratio is from 0.4:1 to about 0.8:1; and most preferably, from 0.4:1 to 0.6:1.

The above first aqueous solution is neutralized in a mixer operated with shear forces. Neutralization can occur using a second aqueous solution having a pH above about 8 such as an ammonia based material selected from the group consisting of ammonium hydroxide, ammonium carbonate, ammonium bicarbonate or urea. The manner of neutralization is controlled in the mixer so the pH of the combined first aqueous solution and the neutralizing base medium is in the range of about 4 to 11, more typically 6 to 11 preferably 7 to 10. This is normally done by adding controlled amounts of (i) acidified aqueous solution of aluminum cations and phosphate anions and (ii) a neutralizing medium as described directly to a shear mixer in a continuous manner.

Alternatively, the first aqueous solution can be a basic solution of salts such as a mixture of sodium aluminate ($Na_2O.Al_2O_3.3H_2O$) and sodium phosphate ($Na_3PO_4.12H_2O$) which is neutralized with an aqueous acid solution with a pH less than 6 such as HCl. The concentration of salts are within the ranges set forth above for the aluminum cations/phosphoric acid and are easily determined by those with ordinary skill in the art. Similarly, the amount of acid e.g. HCl to use and the concentration should be sufficient to result in neutralization with the formation of an aluminophosphate precipitate. The range of pH to employ is as set forth above.

The neutralization reaction is substantially instantaneous and is exothermic. In the prior art methods of preparing aluminophosphate precipitates, large excesses of water were present which served as a heat sink. The prior art methods were really stirred batch techniques where the reaction products remained in contact with fresh reactants until the reaction was complete. The method of this invention involves the continuous addition of the two aqueous solutions to a high shear mixer/reactor, and the continuous removal of the aluminophosphate reaction product substantially as quickly as it is formed. The reaction product can be quenched and/or cooling means can be used to lower the mixer/reactor temperature. The usual temperature in the mixer/reactor is from 20° C. to 90° C.

The key element in the preparation of the new aluminophosphate compositions of this invention is mixing the acid-base reactants with shear. Sufficient shear forces need to be generated to result in the formation of sheets of aluminophosphate as well as spheres in the microstructure of the precipitate.

There are, of course, various types of mixing techniques and apparatus which generate varying levels of shear delivery mixing. See for example, "Scaleup and Design of Industrial Mixing Processes" by Gary B. Tatterson, McGraw-Hill, Inc, (1994) and especially FIG. 2.9 which illustrates the shear level of various types of mixers and impellers. Referring to FIG. 2.9 of Tatterson, which is incorporated herein by reference, the colloid mills, saw blade type impellers; homogenizers and stator rotor mixers provide the highest level of shear while the hydrofoil and propeller provide the lowest shear. The newer jet stream mixers can also be employed with sufficient shear as taught herein.

Shear in this specification means shear rate which is a change in velocity ($\Delta V$) divided by a change in distance ($\Delta d$). For example, in a rotor stator mixer, the fluids to be mixed usually are pumped into the rotor stator chamber through concentric tubes. The rotor stator chamber consists of a rotor revolving at some desired rate and a "stator" or surrounding wall close to the tips of the revolving rotor. The wall is provided with openings to permit the mixed fluids to be removed or withdrawn quickly and continuously from the rotor-stator chamber.

Using the rotor stator mixer as an example, the velocity of the fluid is highest at the tip of the rotor impeller and is zero at the wall. Thus, the $\Delta V$ is taken as the velocity at the tip which can be calculated by multiplying the revolutions of the rotor per second times the radius of the rotor i.e.

$$\Delta V = ND/2$$

where N=revolution of the rotor per second; D=diameter of rotor.

The "change in distance", $\Delta d$, is equivalent to the distance over which one measures the change in velocity, for example, the distance between the tip of the impeller and the wall or W in a rotor stator.

Shear rates thus have the units of reciprocal time.

Obviously the shape of the impeller and the design of the stator have an effect on the amount of shear developed. The stator for example can be a cylindrical wall provided with slots or can be a cylindrical screen.

For purposes of this specification, the apparent average shear rate is defined as the change in velocity over the change in distance and is calculated by the equation:

$$\text{Apparent Average Shear Rate} = \frac{\pi ND}{W}$$

$$\pi = \text{pie} = 3.1416$$

where

N is the revolutions of the impeller per second;

W is the distance between the tip of the impeller and the wall of the mixer; and D is the diameter of the rotor (in the case of rotor-stator mixer) or can be the thickness of the impeller blade for other mixers.

It will be obvious to those with ordinary skill in the art that shear rates can be increased by increasing $\Delta V$ or decreasing $\Delta d$. Just how a high shear rate is effected is not critical so long as sufficient shear is present during mixing to result in the formation of sheets as well as spheres in the microstructure of the aluminophosphate.

The reaction to form the aluminophosphate is an acid-base reaction which occurs rapidly and exothermically. Using a rotor stator high shear continuous mixing device, the reactant are fed into the rotor stator mixer and the aluminophosphate hydrogel removed in times usually from 0.5 to 5 seconds. Most typically the reactions and mixing occurs in less than one second.

As noted above, it is typical and preferred to use more concentrated solutions of aluminum and phosphorus so that on neutralization a precipitate is formed immediately. It has been found that the apparent average shear rate should be at least $0.5 \times 10^4$ reciprocal seconds to result in the formation of sheets of aluminophosphate in the microstructure. The typical shear rates are from $1 \times 10^4$ sec$^{-1}$ to $10 \times 10^4$ sec$^{-1}$; but higher shear rates can be used, if desired.

With the above teachings, one with ordinary skill in the art can with little experimentation discover the appropriate mixing device and shear rate to employ to generate sheets as well as spheres in the microstructure of aluminophosphates made in accordance with this invention.

The product from the high shear mixer can be quenched if desired and is then washed, preferably on a vibrating filtration membrane with continuous washing to reduce the concentration of residual salts (i.e. reaction product such as nitrates or chlorides).

Typically, the initial conductivity of water wash is from 30,000 to 100,000 mmohs. Washing is conducted to reduce the conductivity from this initial value to some lower value, typically from 2,000 to 4,000 mmohs. A reduction in conductivity indicates, of course, a reduction in residual salts. Residual salt reduction is generally desired since such salts may act as poisons to catalytic metals deposited on the support. However, it has been discovered that some residual salt level is required to apparently maintain the stability of the aluminophosphate structure. For example, washing to a conductivity level of 53 mmohs resulted in the formation of a separate alumina phase during calcination. In addition, the desired sheets of aluminophosphate were not present in the microstructure. Washing to conductivity level of 500 mmohs or 1000 mmohs resulted in no phase separation of the product on calcination and sheets of aluminophosphate were present in the microstructure. While not wishing to be bound by any theory, it appears that some residual salt content is required to stabilize the aluminophosphate structure and, indeed, preserve the sheets of aluminophosphate in the microstructure.

The determination of whether or not to employ a quench procedure to reduce the temperature of the aluminophosphate precipitate is a function of the desired size of the pores in the final product. Quenching to a temperature of from 18° to 30° C. tends to make an aluminophosphate product having a more narrow distribution of pores whereas non-quenching of the product tends to broaden the pore size distribution in the product.

It should be noted that the microstructure of the aluminophosphate precipitate is believed to be formed during the initial shear mixing of the reactants. The distribution of pore size and pore volume can be affected by the use or non-use of a quench and whether washing is done with either hot water or cold water. The use of increased temperatures and hot aging tends to shift the product to a larger pore volume and a larger macropore volume. By hot aging it is meant that the product simply sits in a hold vessel for from 1 to 4 hours at a temperature from 50° to 80° C. By hot washing is meant that the product is washed with water which has been heated to a temperature of 50° to 70° or 80° C.

The preferred technique of washing and filtration is by the use of a vibrating filtration membrane. When a vibrating filtration membrane is employed the aluminophosphate is not compacted as a cake so that washing and filtration occur much more quickly than with prior art non-vibrating techniques. After the water has been reduced to the desired conductivity level, the water washing is stopped and the solids are concentrated on the filtration membrane to a level of perhaps 8 to 22% solids, depending on which type of drying is thereafter employed. The temperature of drying is usually from 100° to 130° C. for times varying from 6 to 30 hours. Spray drying, of course, is very rapid and results in the formation of small-spherical beads which are suitable for use in fluid bed type operations.

After drying, the precipitates are calcined by heating in an elevated temperature. Usually the heating is done in an atmosphere containing oxygen (e.g. air) at a temperature from about 300° to 800° C. for a time of up to 16 hours, usually a time from 2 to 16 hours.

Regardless of which method of preparation is used to prepare the aluminophosphate support, the resulting support is dried and then calcined. Thereafter the active catalytic component e.g. chromium is added to the support by methods well known in the art.

Preferably the active catalytic component is a chromium compound which is deposited on the aluminophosphate support by known methods.

The concentration of the chromium compound deposited or incorporated with or upon the carrier is not critical, but ordinarily will be in the range of about 0.1 to 10% and preferably in the range of about 0.2 to 5%, more preferably about 0.3 to 1.5%, and more especially about 0.3 to 1%, expressed as free chromium. Thereafter, the catalysts are activated by being heated as subsequently described.

The chromium may be deposited on the carrier in almost any chemical form such as chromic anhydride or a salt such as chromium chloride, chromium nitrate, chromium acetate, and the like. Upon being heated in the activation step, the chromium is probably converted to a different chemical form. The chromium is probably present as an oxide if air is used, and, is chemically bound to the support. The precise chemical form in which the chromium exists after activation is not known with certainty, but it may exist as an oxide or a phosphate or may be incorporated into the structure of the support.

In one embodiment of the invention, the chromic acid or anhydride or a water soluble chromium salt in an appropriate quantity may be admixed with the aqueous slurry of the carrier as it is prepared. Thereafter the slurry may be dried in any desired manner. One of the preferred methods for preparing the catalysts is to add the chromium compound to the aqueous slurry of the carrier and to then spray dry the slurry. This spray drying technique has the advantage that the catalyst is recovered with a particle size distribution that is convenient for use in the polymerization of ethylene. Typically, the catalyst prepared by the spray drying technique will have particle sizes in the range of about 50–150 microns. Particles outside of this desired range can be removed by screening, but proper spray drying techniques can largely eliminate any need for screening.

The catalysts prepared as described above will be activated by being heated to an elevated temperature in the range of about 300°–950° C. and preferably in the range of about 500°–925° C. The activation is conveniently carried out by the same techniques employed to activate the prior art catalysts previously described, as by being suspended and fluidized in a stream of heated oxygen containing gas.

In yet another embodiment of the invention, a water-soluble chromium compound will be incorporated into the acidic solution employed to prepare the aluminum-phosphorus containing carrier. The precipitation of the aluminum and phosphorus moieties also chromium compound which becomes intimately admixed with the aluminum and phosphorus moieties. When this carrier is heated to the activation temperatures previously described, highly active catalysts are obtained.

In another embodiment of the invention, organochromium compounds can be deposited upon the supports of the type previously described. Examples of suitable organochromium compounds include dicyclopentadienyl chromium (II) and triphenylsilyl chromate. Other organochromium compounds that can be employed are those disclosed in the following-issued U.S. Pat. Nos.:

| | |
|---|---|
| 3,157,712 | 3,709,954 |
| 3,324,095 | 3,756,998 |
| 3,324,101 | 3,757,002 |
| 3,687,920 | 3,806,500 |
| 3,709,853 | |

Such chromium compounds are dissolved in an appropriate solvent which then is used to impregnate the support, after which the solvent is removed by evaporation. With catalysts of this type, it is not necessary to heat activate the finished catalyst. The support will be calcined to temperatures within the range previously discussed before the organochromium compound is deposited thereon.

One of the advantages of the new catalysts of this invention is their high activity so that it is not required, at least in the case where chromium is the active catalytic component, to employ a co-catalyst. However, if desired, co-catalysts such as those described in the prior art e.g. U.S. Pat. No. 4,690,990 can be employed. The type and amount of co-catalyst are not critical and those types and amounts taught in prior art can suitably be employed in the process of this invention. The teachings of U.S. Pat. No. 4,690,990 as regards to the co-catalyst are incorporated herein by reference as a typical example of a suitable co-catalyst which can be used. Examples of co-catalysts include, but are not limited to, triethylborane, diethylaluminum ethoxide, triethylaluminum, ethylaluminum sesquichloride, and mixtures thereof When used, a co-catalyst is usually present at concentrations up to about 15 mole percent of reaction mixture, preferably within the range of about 0.1 to about 12 mole percent of the reaction mixture.

The catalyst of this invention comprising an active catalytic component on the new aluminophosphate supports can be used to polymerize at least one mono-1-olefin containing 2 to 8 carbon atoms per molecule, preferably ethylene, propylene, 1-butene, 1-pentene, 1-hexene; 4-methyl, 1-pentene and 1-octene. The invention is of particular applicability in producing ethylene homopolymers and copolymers from mixtures of ethylene and 0.5 to 2.0 mole percent of one or more comonomers selected from 1-olefins containing 3 to 8 carbon atoms per molecule. Exemplary comonomers for use with ethylene include aliphatic 1-olefins, such as propylene, 1-butene, 1-petene, 1-hexane, 1-octene and other higher olefins and conjugated or non-conjugated diolefins such as 1,3-butadiene, isoprene, piperylene, 2,3-dimethyl-1,3-butadiene, 1,4-pentadiene, 1,7-hexadiene, and other such diolefins and mixtures thereof Ethylene copolymers preferably constitute at least about 90, preferably 96 to 99.8 weight percent polymerized ethylene units and 0.2 to 4 weight percent comonomer. Propylene, 1-butene, 1-pentene, 1-hexene, and 1-octene are especially preferred comonomers.

The polymers can be prepared with the catalyst of this invention by solution polymerization, slurry polymerization, and gas phase polymerization techniques using conventional equipment and contacting processes. Contacting of the monomer or monomers with the catalyst can be effected by any manner known in the art of solid catalysts. One convenient method is to suspend the catalyst in an organic medium and to agitate the mixture to maintain the catalyst in suspension throughout the polymerization process. Other known contacting methods such as fluidized bed and gravitating bed can also be employed.

The catalyst of this invention is particularly suitable for use in slurry polymerizations. The slurry, or particle form, process is generally carried out in an inert diluent (medium) such as paraffin, cycloparaffin or aromatic hydrocarbon. For predominantly ethylene polymers, a temperature of about 66° to about 110°0 C. is employed. Pressures in the particle form process can vary from about 110 to about 700 psia (0.65–4.8 MPa) or higher. The catalyst is kept in suspension and is contacted with the monomer or monomers at sufficient pressure to maintain the medium and at least a portion of the monomer or monomers in the liquid phase. The medium and temperature are thus selected such that the polymer is produced as solid particles and is recovered in that form. Catalyst concentrations can be such that the catalyst content ranges from 0.001 to about 1 weight percent based on the weight of the reactor contents.

Hydrogen can be used to control molecular weight as is known in the prior art. When used, it is generally used at concentrations up to about 2 mole percent of reaction mixture, preferably within the range of about 0.1 to about 1 mole percent of reaction mixture.

The catalysts of this invention are particularly useful in the gas phase fluid bed process for the polymerization of alpha olefins. The gas phase process is operated by injecting etylene and /or other gaseous alpha olefins into the bottom of a fluid bed reactor along with other gases such as hydrogen. Catalyst is injected appropriately into the reactor and polymer is formed and grows on the catalyst. The polymer particles must have a proper size to density or the fluid bed will tend to collapse during operation. Usually, in the prior art gas phase processes, the shape of the polymer mimics the shape of the original catalyst particles i.e., usually spherical and uniform in size. It is a surprising feature of this invention that irregularly shaped polymer particles are formed in a variety of sizes.

The reaction conditions to employ in the gas phase fluid bed process are well known in the art and form no part of this invention. A suitable temperature range is from 68° F. to 392° F. (20° C. to 200° C.) with the usual temperatures being from 120° F. to 215° F. (50° C. to 100°C.) at a pressure of atmospheric to 70 kg/cm$^2$G, preferably atmospheric to 20 kg/cm$^2$G, and for a length of time of 5 minutes to 10 hours, preferably 5 minutes to 5 hours. When hydrogen is employed, the same partial pressures as set forth above for the slurry process can suitably be used.

The polymer products are continuously removed from the fluid bed unit and treated in the conventional way.

The experimental work was done first in batch reactors and later in a gas phase reactor. The preparation of the catalysts used in the experimental work is also shown below.

EXAMPLE 1

Batch Catalyst Preparation By Prior Art Technique

In the run for this Example, 101.3 pounds of DI water were added to a 35 gallon mixing tank. With mixing (an air driven marine impeller mixer), 6.6 pounds of Al (NO$_3$)$_3$.9H$_2$O (assay 97%) were added to the water. Mixing was continued until the solids dissolved. The pH of this first solution was 2.8.

To the first solution was added 992.5 grams of phosphoric acid (assay 85.6% H$_3$PO$_4$) to form a second solution with a pH of about 1.0.

A separate solution of ammonium hydroxide (assay 28–30% NH$_3$) was prepared.

About 13 liters of DI water were added to a 55 gallon mixing tank to engage the impeller. With mixing at about 350 RPM with a marine impeller, the second solution containing the aluminum cations and phosphoric acid was pumped into the tank at 1300 ml/minute. The addition of the ammonium hydroxide through a separate line into the tank was begun immediately, and the rate of addition of base adjusted to maintain a pH of 8.0 in the tank. A hydrogel formed immediately. Reaction was continued until all of the second solution was added.

The hydrogel was washed on a vibrating filtration membrane (as described above) with about 100 gallons of DI water until a conductivity level of about 3000 mmohs was achieved. The hydrogel was pumped onto a large buchner funnel and filtered.

The filter cake was added to a 10 gallon planetary mixer and mixed for about 5 minutes to homogenize the hydrogel into a pumpable material prior to spray drying.

The homogenized hydrogel was pumped to the feed system of a Stork-Bowen BE 1235 spray dryer. The median particle size of the product was 130 microns, and the LOM wt % moisture was 11.4.

The dried hydrogel was calcined in a fixed fluid bed type calciner at 300° C. for eight hours.

The calcined material had the characteristics shown in Table 1 below.

TABLE 1

ALUMINOPHOSPHATE CHARACTERISTICS

| | CHARACTERISTICS[1] | Example 1 | Example 2 | Example 16 | Example 16(a) | Example 16(b) | Example 16(c) |
|---|---|---|---|---|---|---|---|
| (1) | PARTICLE SIZE[2] MEDIAN, MICRONS | 148.5 | 124 | 117 | 106 | 128 | 105 |
| (2) | FRAGMENTATION POTENTIAL (30-1) | 25 | — | 50 | 53 | 48 | 46 |
| (3) | FRAGMENTATION[3] POTENTIAL (30-0) | 29 | ~71 | 55 | — | — | — |
| (4) | SURFACE AREA M$^2$/gm | 106 | 206 | 93 | 104 | 106 | 105 |
| (5) | MESOPORE VOLUME cc's/gm | 0.97 | 0.68 | 0.54 | 0.63 | 0.56 | 0.58 |
| (6) | MEAN MESOPORE DIAMETER°A | 411 | 240 | 326 | 313 | 283 | 292 |
| (7) | MACROPORE VOLUME cc's/gm | 0.06 | 0.38 | 0.21 | 0.26 | 0.22 | 0.16 |
| (8) | SHEETS BY TEM | No | Yes | Yes | Yes | Yes | Yes |
| (9) | N$_L$ | 0 | 0.439 | 0.616 | — | — | — |
| (10) | P/Al MOLE RATIO | 0.49 | — | 0.49 | 0.55 | — | — |
| (10) | TOTAL PORE VOLUME cc's/gm | 1.04 | 1.11 | 0.89 | — | — | — |

[1]Calcining was done in a large (10,000 grams) pilot plant unit for Examples 1 and 16 and a small (100 gram) pilot plant unit for Example 2.
[2]The median particle size after drying and calcining was such that the aluminophosphates would be satisfactory for use in a gas phase fluid bed polythylene operation.
[3]In Example 2, the fragmentation potential was determined using an Horiba LA 500 instrument.

The above dried aluminophosphate was submitted for microscopic examination using the standard TEM techniques discussed above. FIG. 1, as discussed above, is at a magnification of about 1,000× and shows the presence of only spheres. The N$_L$ for the aluminophosphate was 0 micron$^{-1}$.

The above dried base was sent to an outside company for the addition of chromium at a target level of 0.7 weight %, after drying and calcining at 600° C. for 8 hours.

The dried chromia catalyst was activated using a bench-scale 28 mm diameter fluidized bed under a stream of dry air at 600° C. for 8 hours. The activator tube is constructed from a 28 mm diameter quartz tube, a medium quartz frit, and a 67 mm diameter quartz disengaging section. The fluidization section is 300 mm long from the frit to the half angle transition, and the disengaging section is 400 mm tall. The transition incorporates an 11° half angle, for ideal transitions in fluidized bed systems design. The whole activator tube is enclosed in a 1,100° C. Lindberg tube furnace and can be purged with dry argon or low dewpoint air, typically at ~1L/min. Gas flow direction is from the bottom to the top, and a cyclone trap is connected to the outlet to collect fines, which might otherwise escape into the atmosphere.

EXAMPLE 2

Catalyst Preparation For A Catalyst Of This Invention

An aluminophosphate catalyst support was prepared by the continuous gel method of this invention to prepare an aluminophosphate base containing sheets of aluminophosphate as well as spheres on a microlevel.

In the run for this Example 2, 10 kg of hot (50° C.) deionized (DI) water were added to a Jaygo planetary mixer equipped with a water jacket with water circulated in the jacket at room temperature.

After turning on the mixer, 20.85 kg of solid aluminum nitrate (assay 97% $Al(NO_3)_3 \cdot 9H_2O$) was added in 10 kg increments until all was added. Mixing is continued until all solids are dissolved. The pH of the resulting solution is about one.

Phosphoric acid (85.6% $H_3PO_4$) was then added (3.2 kg). The resulting solution had a pH of less than zero.

A 1:1 volume mixture of ammonium hydroxide (assay 36% $NH_3$) (about 18.6 kg) and DI water was prepared.

The aluminum and phosphorus solution and the ammonium hydroxide were simultaneously pumped into the mixing chamber of a Ross-In-Line Laboratory Emulsifier (obtained from Charles Ross and Son Company, Hauppauge, N.Y., Model ME 300L).

The mixing chamber 10 is fitted with a rotor impeller having four arms and a stationary cylindrical wall surrounding the rotor impeller and in relatively close proximity to the tips of the impeller arms. The stationary wall 18 is provided with slots through which the fluids and produced hydrogel pass into the annular portion of the mixing chamber and then out into a holding tank.

The acid (aluminum-phosphorus solution) and base solutions react in the mixing chamber while the rotor impeller operates at 5000 rpm to provide the apparent average shear rate of about $3.55 \times 10^4$ sec$^{-1}$. The rate of addition of the acid and base solutions into the mixing chamber is set to achieve a pH of 8 at the outlet of the mixing chamber. The exothermic reaction of the acid and base solutions is substantially instantaneous to form a hydrogel. The hot (55° C.) hydrogel is collected in a 55 gallon tank. The mixing is done at atmospheric pressure and temperature but under a blanket of nitrogen. The weight percent solids (by LOM loss on microwave) was 10.6%.

The product was quenched. Quenching involved adding the hot (55° C.) hydrogel from the mixer-reactor to a stirred tank containing DI water at about 18° C. The temperature in the tank increased about 10° C. as a result of the addition of the hydrogel.

The hydrogel in the holding tank was diluted with DI water to about 4 weight % solids as measured by an LOM instrument (CEM AVC 80). The dilute hydrogel was washed on a vibrating filtration membrane machine (New Logic International VSEP machine (series P) where VSEP stands for Vibratory Shear Enhanced Processing). This washing process known as difiltration involves dewatering the hydrogel and adding fresh DI water at the same rate at which the filtrate or permeate containing excess salts of reaction is removed. The washing was continued until the permeate conductivity went from 68,000 mmohs to 2,700 mmohs. The hydrogel was then concentrated to 17 weight percent solids which were then fed to a Stork Bowen E 1235 spray drier and dried.

The dried hydrogel was calcined in a fixed fluid bed type calciner at 300° C. for eight hours. The characteristics of the aluminophosphate are summarized on Table 1 below. The preparation variables are summarized on Table 2 below.

The spray dried and calcined aluminophosphate was impregnated with an aqueous solution of $CrO_3$ to deposit from 0.35 to about 1 weight percent chromium on the support. The chromium impregnation was done using a Buchi rotovap. A maximum of 50 g of the aluminophosphate powder was added to a 500 ml rotovap flask. One hundred g of water is added to the powder (water to powder ratio is always approximately 2 to 1 by weight). Swirl the flask to achieve uniform wetting of the powder. Weigh CrO3 and dissolve in DI water (approximately 15–30 ml). Add the chromium solution to the powder slurry and swirl to evenly coat the powder. Attach flask to the Buchi and spin the flask for approximately 5 minutes without vacuum to mix the slurry. Using a vacuum regulator and vacuum pump, set the vacuum to approximately 400 mm Hg, and lower the flask into an 80° C. water bath. Maintain these conditions until approximately 80% of the water has evaporated. Slowly increase the vacuum to approximately 600 mm Hg as necessary to remove the last of the water without "bumping" any of the slurry/powder over. When the powder appears completely dry increase the vacuum to maximum for approximately 5 minutes. After the last vacuum adjustment is complete release the vacuum and shut off the Buchi.

The catalyst was activated in the same manner as in Example 1 above.

The dried and calcined aluminophosphate, before the addition of chromium, was subjected to TEM analysis to show it contained both sheets of aluminophosphate as well as spheres. FIG. 2 is a photomicrograph (about 11,000 magnification) of the base and clearly shows the presence of both sheets and spheres. Contrast this with FIG. 1 which shows only spheres for the catalyst

TABLE 2

| | VARIABLES IN PREPARATION | | | |
|---|---|---|---|---|
| EXAMPLE NO. | 2 | 16(a) | 16(b) | 16(c) |
| 1. SOLUTIONS | | | | |
| Al Source | | | | |
| $Al(NO_3)_3 \cdot 9H_2O$, kg | 20.8 | 62.5 | 62.5 | 62.5 |

TABLE 2-continued

VARIABLES IN PREPARATION

| EXAMPLE NO. | | | 2 | 16(a) | 16(b) | 16(c) |
|---|---|---|---|---|---|---|
| | Phosphorus Source | | | | | |
| | H$_3$PO$_4$, kg | | 3.2 | 9.456 | 9.456 | 9.456 |
| | DI H$_2$O, kg | | 10 | 27 | 27 | 27 |
| 2. | pH of (Al—P) Solution | | <0 | <0 | <0 | <0 |
| 3. | GELATION | | | | | |
| | RPM of Rotor | | 5000 | 5000 | 5000 | 5000 |
| | pH at outlet | | 8 | 8 | 8 | 8 |
| | T (Final) °C. | | 55 | 55 | 57 | 57 |
| | WT % Solids (LOM) | | 10.6 | 8.9 | 10.4 | 23 |
| 4. | WASH | | | | | |
| | (i) | Diafiltration — Dilute to WT % Solids by LOM | 4 | 5.7 | ~5 | ~5 |
| | (ii) | Conductivity of Wash Water | | | | |
| | | (a) Initial, mmohs | 68,000 | 108,000 | 99,000 | 100,000 |
| | | (b) Final, mmohs | 2,700 | 3,100 | 3,000 | 3,100 |
| | (iii) | Wash Time, Min. | 67 | 600 | 528 | 600 |
| | (iv) | Wash Temperature °C. | ~50 | ~50 | ~50 | 38–50 |
| | (v) | WT % Solids by LOM of Concentrate | 17 | 15 | 15.5 | 16 | base from Example 1 using the prior art technique for preparation. The $N_L$ for the aluminophosphate was 0.439 micron$^{-1}$.

Batch Polymerization Runs

Polymerizations were performed in two liter autoclave reactors equipped with Genesis control systems. A dried 316 stainless steel two liter Autoclave Engineers Zipperclave reactor system is heated at 80° C. in-vacuo until a pressure of <50 microns of Hg is achieved. The reactor is then charged with a mixture of 200 mg catalyst and 0.5M (0.65 mg) of IBAO (in an Al to Cr proportion of 5) in 2000 mL heptane contained in a 500 mL glass addition funnel that is fitted with a Kontes vacuum valve. The IBAO is isobutyla-luminoxane and is added to scavenge unwanted catalyst poisons such as oxygen. A Kontes valve is connected to the reactor on an Cajon Ultra-Torr fitting, and the mixture is introduced into the reactor in-vacuo. The reactor is stirred at 550 rpm and ethylene is introduced to an internal setpoint pressure of 300 psig. The reactor temperature is maintained at the setpoint temperature, 80° C. with a Neslab RTE-100 water-bath/circulator. The reaction is allowed to proceed to a given productivity, typically depletion of 80L of C$_2$H$_4$ after which the reactor is vented and purged twice with argon and shut down. The reactor is opened while it is still hot and the contents are quickly removed. The reactor is cleaned and prepared for the next reaction. The "L" above refers to "liters".

EXAMPLES 3–8

A series of repetitive benchmark batch polymerization runs were made using the prior art catalyst of Example 1 above. The results are shown in Table 3 below. Referring to Table 3, all the runs were duplicate runs to achieve an ethylene uptake of between 80 and 100 liters during the reaction.

EXAMPLES 9–14

A series of batch polymerization runs were made using the catalyst of this invention as set forth in Example 2 above. The results are shown in Table 4 below:

TABLE 3*

| Example No | Dehydration Thermal History | WT % Chromia Load | Activity (g/g CAT/hr) | Activity (g/g Cr/hr) ×1000 | Yield (g) | Run Time (hr) |
|---|---|---|---|---|---|---|
| 3 | 8 hr, 300° C. | 0.7 | 554.7 | 79.25 | 105.4 | 0.95 |
| 4 | 8 hr, 300° C. | 0.7 | 544.4 | 77.77 | 87.1 | 0.80 |
| 5 | 8 hr, 300° C. | 0.7 | 656.2 | 93.74 | 85.3 | 0.65 |
| 6 | 8 hr, 300° C. | 0.7 | 620.6 | 88.66 | 84.4 | 0.68 |
| 7 | 8 hr, 300° C. | 0.7 | 509.1 | 72.74 | 83.5 | 0.82 |
| 8 | 8 hr, 300° C. | 0.7 | 503.3 | 71.89 | 92.6 | 0.92 |

*Batch Reactor Runs Using Prior Art Aluminophosphate Supports i.e. no sheets in the microstructure.

TABLE 4*

| Example No | Dehydration Thermal History | % Chromia Load | Activity (g/g CAT/hr) | Activity (g/g Cr/hr) ×1000 | Yield (g) | Run Time (hr) |
|---|---|---|---|---|---|---|
| 9 | 8 hr, 300° C. | 0.35 | 384.1 | 109.73 | 86.8 | 1.13 |
| 10 | 8 hr, 300° C. | 0.35 | 376.0 | 107.43 | 94.0 | 1.25 |
| 11 | 8 hr, 300° C. | 0.7 | 910.0 | 130.00 | 81.9 | 0.45 |
| 12 | 8 hr, 300° C. | 0.7 | 1165.0 | 166.43 | 93.2 | 0.40 |
| 13 | 8 hr, 300° C. | 1 | 316.5 | 31.65 | 84.2 | 1.33 |
| 14 | 8 hr, 300° C. | 1 | 1054.7 | 105.47 | 90.7 | 0.43 |

*Batch Reactor Runs Using Aluminophosphate Supports of this Invention.

Referring to Table 3, Examples 3–8 were duplicate runs using the catalyst as prepared in Example 1 i.e., the prior art aluminophosphate having no sheets on a microlevel. The activity of the catalyst on a gram of polymer per gram of chromium per hour varied from 71.89×1000 (Example 8) to 93.74×1000 (Example 5).

Referring to Table 4, Examples 9–13 were batch type runs using a catalyst as prepared in Example 2 i.e., the catalyst of this invention possessing in their microstructure sheets of aluminophosphate as well as spheres.

Examples 11 and 12 had a 0.07 weight % chromium load and thus the results can be compared with the results of the runs in Table 3 where the chromium load was 0.7 weight percent in all Examples. Comparing the activity of the catalyst of this invention in Example 11 and 12 with the runs in Table 3 shows a surprisingly higher activity for the catalyst of this invention i.e. 130 to 166.43 g/gCr/hr×1000 compared to 71.89 to 93.74×1000 for the catalyst in Table 3 (prior art catalysts).

Referring to Table 4, it can be seen that activity increases when the chromium load increases from 0.35 wt % (Examples 9 and 10) to 0.7 wt % (Example 11 and 12) i.e. the activity increases from about 108.5 g/gCr/hr to about 148 g/gCr/hr. A further increase in chromium to 1 wt % (Example 13) results in an activity similar to 0.35 wt % level. The optimum chromia load therefore appears to be about 0.5 to 0.80.

Continuous Gas Phase Runs

Experimental runs were also made in a continuous gas phase pilot plant reactor. The pilot plant reactor is a small fluidized bed reactor with feed inlet near bottom for ethylene or other gaseous monomers or co-monomers plus hydrogen.

EXAMPLE 15

Gas Phase Run with Prior Art Catalyst

In the run for this Example, the catalyst from Example 1 above was used in a gas phase fluidized bed operation except the chromium level was 0.6 weight percent. The reactor temperature was 215° F. The partial pressure of ethylene was 85%. There was 3.2 mole % hydrogen and 2 mole percent butene in the reactor. The catalyst was activated at a temperature of 600° C. for 8 hours.

The resulting polymer had a density of 0.951 g/cc; and an ash level of 700 to 1000 ppm and an HLMI (high load melt index) of 15 to 16. The results are summarized in Table 5 below.

EXAMPLE 16

Catalyst Preparation

The aluminophosphate preparation procedure of Example 2 was repeated in three separate but substantially identical runs except no quenching was employed. The details for each of the three runs is summarized in Table 2 or Example 16(a), 16(b) unit 16(c).

The aluminophosphate products from each of Examples 16(a), (b) and (c) were dried and thereafter calcined at 300° C. for 8 hours. A representative sample of each of the three products was then blended thoroughly and a further representative sample was submitted for microscopic examination using the standard TEM technique as discussed above. FIG. 3 is at a magnification of about 11,000× for the blended sample prepared as set forth above. Referring to FIG. 3, it can be seen that both sheets and spheres are present in the microstructure. The $N_L$ for this aluminophosphate was $0.616 \times 10^4$.

The other characteristics of this Example 16 aluminophosphate are summarized on Table 1 along with the characteristics of the aluminophosphates prepared in each of Examples 16(a), (b) and (c).

A comparison of FIGS. 2 and 3 shows the presence of more sheets for the aluminophosphate in FIG. 3 (prepared as in Example 16). That more sheets are present I FIG. 3 is also shown by the higher $N_L$ value for the aluminophosphate shown therein.

It should be noted that TEM microphotographs were taken for each of the dried aluminophosphates from runs 16(a), (b) and (c) and each of these photomicrographs was similar to FIG. 3.

The aluminophosphate base was sent to a third party for impregnation with $CrO_3$. The dried catalyst was clacined at 600° for two hours. The surface area after the second higher temperature calcination was 76 m² per gram showing only an 18% loss. The weight percent chromium in the final catalyst was about 0.54. The weight percent aluminum and phophorus were 26.2 and 14.7 respectively.

The catalyst was then activated by heating to 600° C. for 8 hours in a manner similar to that set forth in Example 1 above.

EXAMPLE 17

Example 15 was repeated except the reactor temperature was 220° F.; the hydrogen mole % 3.2 with no butene-1.

The resulting polymer had a density of 0.9580, an ash level of 600 to 1000 ppm, and an HLMI of 6.5. The results are summarized in Table 5 below.

EXAMPLE 18

Example 15 was repeated except using the catalyst of Example 16. The reactor temperature was 218° F. The ethylene partial pressure was 85 psig. The mole % hydrogen was 2.56 and the mole % butene-1 was 0.58.

The resulting polymer had a density of 0.9446, an ash level of 20 to 50 ppm and an HLMI of 6.9. The results are summarized in Table 5 below.

TABLE 5

Gas Phase Polymerization of Ethylene

| | Reactor Conditions | | | Polymer Properties | | | | |
|---|---|---|---|---|---|---|---|---|
| Example No. | Reactor Temp °F. | Mole % $H_2$ | Mole % Butene-1 | HLMI | Ash Level | $M_w$ | MWD ($M_w/M_n$) | Density |
| 15[1] | 215 | 3.2 | 2 | 15–16 | 700–1000 | 169,000 | 22 | 0.9510 |
| 17[1] | 220 | 3.2 | 0 | 6.5 | 600–1000 | 214,000 | 24 | 0.9580 |
| 18[2] | 218 | 2.56 | 0.58 | 6.9 | 20–50 | 189,700 | 5 | 0.9446 |

[1]Used catalyst of Example 1 prepared by method of prior art.
[2]Used catalyst of Example 16 prepared by method of this invention.

Example 17 in Table 5 is a repeat of Example 15 using the prior art aluminophosphate supported catalyst but at a slightly higher reaction temperature (220° F.) and no 1-butene. The density of the product was as expected at 0.9580. This was expected since, as noted above, the theoretical density for polyethylene with no butene is 0.960. The molecular weight of the product increased illustrating that the 1-butene in Example 15 was acting as a chainterminating agent rather than being incorporated into the product. In general the HLMI of the product tends to decrease as the molecular weight increases which is shown by an HLMI of 6.5 for Example 17 compared to an HLMI of 15–16 for Example 15. As expected, the MWD of the product from Example 17 was similar to the product from Example 15, i.e. was broad. Referring again to Table 5, there is a significant difference in the high load melt index (HLMI) of the products using the catalyst of the prior art [Example 15 (no sheets) with an HLMI of 15–16] versus the catalyst of this invention (Example 18 with an HLMI of 6.9). This difference in HLMI is mirrored in a similar difference in densities i.e. 0.9510 for Example 15 and a much lower density of 0.9446 for Example 18 considering the molecular weights were fairly close. The theoretical density of polyethylene if no butene is incorporated is 0.960. It can be seen in Example 15 that very little butene is incorporated in the product which has a density of 0.9510. On the other hand, the use of the catalysts of this invention resulted in a surprising incorporation of butene-1 into the product as illustrated by a product density of 0.9446 (Example 18), this despite the fact the butene-1 concentration in the reactor was considerably less i.e. 0.58% in Example 18 versus 2% in Example 15.

Referring again to Table 5, the ash level in the product from Example 18 is considerably less (20–50 ppm) than the ash level in Example 15 (700–1000). The ash level is an accepted measure of catalyst activity. Quite surprisingly, the catalysts of this invention (Example 18) were much more active than the aluminophosphate catalysts of the prior art (Example 15). Thus for gas phase operation, the catalysts of this invention can be used without a co-catalyst to enhance activity.

In addition, the ash level of the product from Example 18 is so low that the product could conceivably be used for the more demanding film market where low ash levels are a benefit.

One of the problems with the use of prior art aluminophosphates as polymer catalyst supports was the presence of undesirably large amounts of a low molecular weight portion as shown by an MWD of 22 in Example 15. This low molecular weight material may aid processing but smoking of the product occurs under some conditions. An added potential advantage of the use of the catalysts of this invention is the substantial reduction of this low molecular weight tail material as shown by an MWD of 5 in Example 18.

Applicants invention will be further defined, but not limited, to the claims below.

We claim:

1. A polymerization process comprising: contacting at least one mono-1-olefin having from 2 to 8 carbon atoms per molecule inclusive under polymerization reaction conditions in a polymerization reaction zone with a catalyst comprising an active catalytic component on an aluminophosphate support PREPARED FROM AQUEOUS SOLUTIONS OF ALUMINUM AND PHOSPHORUS IONS, and wherein the phosphorous to aluminum mole ratio of said aluminophosphate is less than one, said aluminophosphate being further characterized as (a) amorphous and (b) having, on a microlevel, sheets of aluminophosphate as well as spheres of aluminophosphate, and recovering a polymer.

2. A process according to claim 1 wherein said catalytic component comprises a chromium component on the aluminophosphate support.

3. A process according to claim 1 wherein said at least one mono-1-olefin is selected from ethylene, propylene; butene-1; hexene-1 and octene-1.

4. A process according to claim 3 wherein said at least one mono-1-olefin comprises ethylene and from 0.5 to 2 mole percent of one additional mono-1-olefin selected from propylene; butene-1, hexene-1 and octene-1.

5. A process according to claim 2 wherein the phosphorus to aluminum mole ratio is from 0.2:1 to 0.8:1.

6. A process according to claim 3 wherein said aluminophosphate has a macropore volume of at least 0.1 cc's per gram.

7. A process according to claim 3 wherein said aluminophosphate has a fragmentation potential of at least 30.

8. A process according to claim 7 wherein said aluminophosphate has a macropore volume of at least 0.1 cc's per gram.

9. A process according to claim 8 wherein said catalytic component comprises a chromium component on the aluminophosphate support.

10. A process according to claim 1 wherein the $N_L$ in a photomicrograph at about 12,000× magnification is from 0.1 to 3 $micron^{-1}$.

* * * * *